United States Patent
Muttik et al.

(10) Patent No.: US 6,785,820 B1
(45) Date of Patent: Aug. 31, 2004

(54) SYSTEM, METHOD AND COMPUTER PROGRAM PRODUCT FOR CONDITIONALLY UPDATING A SECURITY PROGRAM

(75) Inventors: Igor G. Muttik, Berkhamsted (GB); Vincent P. Gulletten, Beaverton, OR (US); Craig D. Schmugar, Hillsboro, OR (US)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 10/115,379

(22) Filed: Apr. 2, 2002

(51) Int. Cl.[7] .................. G06F 11/30; G06F 12/00; G06F 12/14; G06F 17/30; H04L 9/00; H04L 9/32

(52) U.S. Cl. .................. 713/200; 713/188; 713/189; 713/191; 713/192; 707/203

(58) Field of Search .................. 713/191, 189, 713/188, 200; 719/192; 707/203

(56) References Cited

U.S. PATENT DOCUMENTS

| | | | | |
|---|---|---|---|---|
| 5,123,047 A | * | 6/1992 | Rosenow | 713/191 |
| 5,371,692 A | | 12/1994 | Draeger et al. | 364/580 |
| 5,499,295 A | | 3/1996 | Cooper | 380/23 |
| 5,948,104 A | * | 9/1999 | Gluck et al. | 713/200 |
| 6,058,478 A | * | 5/2000 | Davis | 713/191 |
| 6,076,167 A | * | 6/2000 | Borza | 713/201 |
| 6,167,407 A | * | 12/2000 | Nachenberg et al. | 707/203 |
| 6,240,530 B1 | | 5/2001 | Togawa | 714/38 |
| 6,338,141 B1 | * | 1/2002 | Wells | 713/200 |
| 2001/0014150 A1 | | 8/2001 | Beebe et al. | 379/189 |
| 2002/0152394 A1 | * | 10/2002 | Kadoya | 713/191 |

* cited by examiner

*Primary Examiner*—Gilberto Barron
*Assistant Examiner*—Benjamin E. Lanier
(74) *Attorney, Agent, or Firm*—Silicon Valley IP Group, PC; Kevin J. Zilka; Christopher J. Hamaty (57) ABSTRACT

A system, method and computer program product are provided for updating security software on a client. Initially, a parameter indicating a difference between a security update file and a previous security update file is identified. Next, a security program is conditionally updated with the security update file based on the parameter.

22 Claims, 5 Drawing Sheets

SYSTEM, METHOD AND COMPUTER PROGRAM PRODUCT FOR CONDITIONALLY UPDATING A SECURITY PROGRAM

FIELD OF THE INVENTION

The present invention relates to computer security, and more particularly to updating computer security software.

BACKGROUND OF THE INVENTION

Computer security is affected by numerous factors. One example of such factors is the infiltration of computers by computer viruses. The generation and spread of computer viruses is a major problem in modern day computing. Generally, a computer virus is a program that is capable of attaching to other programs or sets of computer instructions, replicating itself, and performing unsolicited or malicious actions on a computer system. Generally, computer viruses are designed to spread by attaching to floppy disks or data transmissions between computer users, and are designed to do damage while remaining undetected. The damage done by computer viruses and computer Trojan horses may range from mild interference with a program, such as the display of an unwanted political message in a dialog box or stealing sensitive data, to the complete destruction of data on a user's hard drive. It is estimated that new viruses and Trojans are created at a rate of over 100 per month.

A variety of programs have been developed to detect and destroy computer viruses. As is known in the art, a common method of detecting viruses is to use a virus scanning engine to scan for known computer viruses in executable files, application macro files, disk boot sectors, etc. Generally, computer viruses are comprised of binary sequences called "virus signatures." Upon the detection or a virus signature by the virus scanning engine, a virus disinfection program may then be used to extract the harmful information from the infected code, thereby disinfecting that code. Common virus scanning software allows for boot-sector scanning upon system boot-up, on-demand scanning at the explicit request of the user, and/or on-access scanning of a file when that file is accessed by the operating system or an application.

In order to detect computer viruses, a virus scanning engine is generally provided in conjunction with one or more files called "virus signature files" (also known as virus definitions or scanner updates). The virus scanning engine scans a user's computer files via a serial comparison of each file against the virus signature files. Importantly, if the signature of a certain virus is not contained in any of the virus signature files, that virus will not be detected by the virus scanning engine.

Generally speaking, a recent trend is for manufacturers of antivirus applications to update their virus signature files as new viruses are discovered and as cures for these viruses are developed, and to make these updated signature files available to users on a periodic basis (e.g. daily, weekly, monthly, etc.). For example, an antivirus program manufacturer may post the update file on a bulletin board system, on an FTP (File Transfer Protocol) site, or on a World Wide Web site for download.

Currently, when any new virus appears that has public attention, the various antivirus companies provide some sort of "risk assessment" (RA). Corresponding threat description including this RA is usually posted on the Internet. This helps users determine if they need to update their systems, and how quickly. Unfortunately, these same users have to decide on their own whether some particular virus risk is high enough for their environment. They may also have to read the virus description, and check which update is associated with the virus. Moreover, they may need to check when such update is made available. If there are several threats they will have to do that more then once.

In addition, this process is prone to mistakes and delays, namely because it relies on a human to digest the information. Also, the current system has no way of conveying the information about the risk of an update to the users in an automatic manner. Human analysis is expensive and the delays in the process can have serious ramifications. For example, the assessment may not be completed and the essential update may not be deployed in sufficient time to be effective.

These issues are particularly important in the corporate environment where deploying updates is a very expensive task because of the number of computers that need updating (i.e. requiring bandwidth, network and human resources, etc.). Often, information technology (IT) managers spend a lot of time determining which updates are important and which can wait.

DISCLOSURE OF THE INVENTION

A system, method and computer program product are provided for updating security software on a client. Initially, a parameter is received which is associated with a security update file. Next, a security program is conditionally updated with the security update file based on the parameter.

In one embodiment, the parameter may represent a priority associated with the security update file. Further, the parameter may represent a risk associated with a virus that the security update file is capable of detecting. Still yet, the parameter may represent a size of the security update file, or a cost associated with the security update file. As an option, the parameter may represent a prevalency associated with a virus that the security update file is capable of detecting.

In another embodiment, an array of parameters may be received. Each of the parameters of the array may correspond with one or more records of the security update file. In such embodiment, the security program may be conditionally updated with the one or more records of the security update file based on the associated parameter. Optionally, the array of parameters may be expandable and customizable.

In still another embodiment, the parameter may identify a difference between the security update file and a previous security update file with respect to a particular aspect. A plurality of the parameters associated with the security update file may be received each time the security update file is updated. During use, the parameters may be summed. As such, the security program may be conditionally updated with the security update file based on the summed parameters.

In still yet another embodiment, the security program may be conditionally updated with the security update file based on a test involving the parameter. Such test may involve a threshold. Further, the threshold may be updated by a user. Still yet, the threshold may be selected based on the security program. The default value of the threshold can be included in the update also.

DESCRIPTION OF THE PREFERRED EMBODIMENTS

Figure 1:
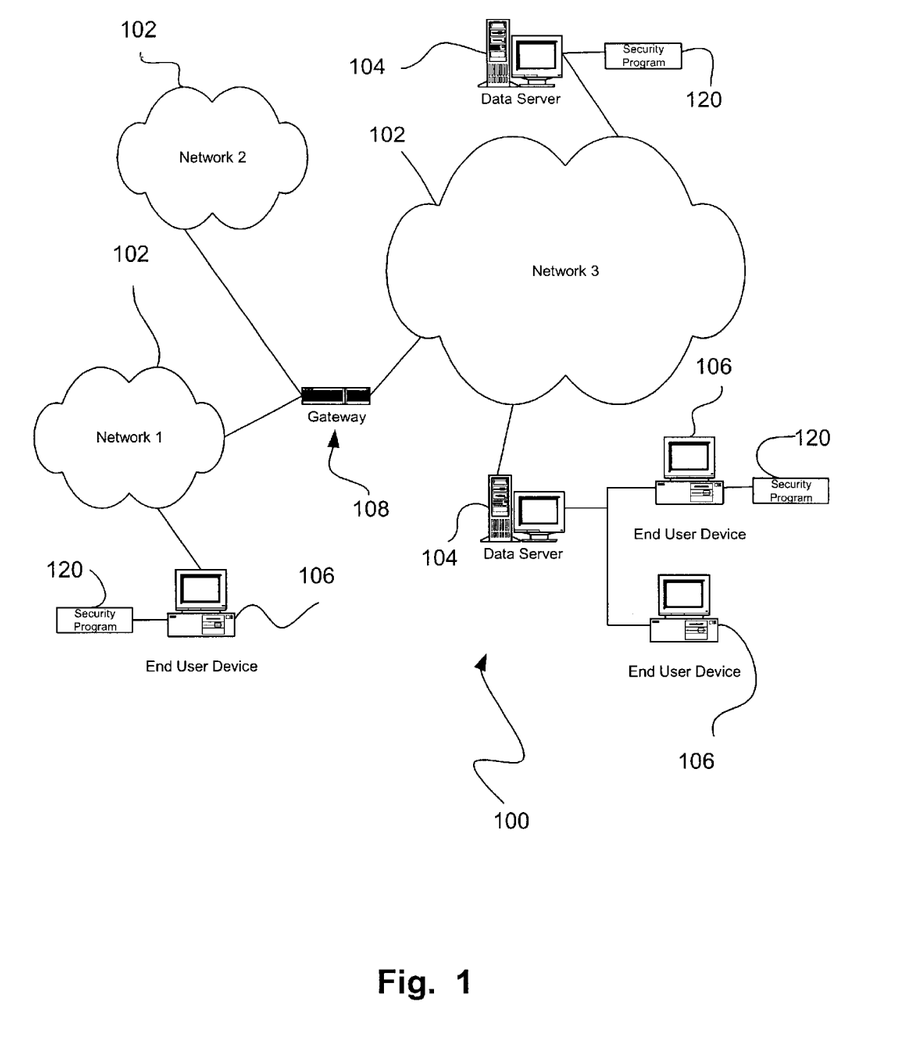
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data servers 104 which are capable of communicating over the networks 102. Also coupled to the networks 102 and the data servers 104 is a plurality of end user computers 106. In the context of the present description, such end user computers 106 may include a web server, desktop computer, lap-top computer, hand-held computer, printer or any other type of hardware/software.

In order to facilitate communication among the networks 102, at least one gateway 108 is coupled therebetween. It should be noted that each of the foregoing network devices as well as any other unillustrated devices may be interconnected by way of a plurality of network segments.

Any of the foregoing components and/or segments may be equipped with a security program 120. Such security program 120 may be equipped to probe for network weaknesses by simulating certain types of security events that make up an attack. Such security program 120 may also test user passwords for suitability and security. Moreover, the security program 120 may also search for known types of security events in the form of malicious programs such as viruses, worms, and Trojan horses. Still yet, the security program 120 may be adapted for content filtering to enforce an organization's operational policies [i.e. detecting harassing or pornographic content, junk e-mails, misinformation (virus hoaxes), etc.]. Of course, the security program 120 may take any other sort of measures to enhance the security of a computer.

Instead of or in addition to any of the foregoing capabilities, the security program 120 may be conditionally updated. Initially, a parameter is received which is associated with a security update file. Next, a security program is conditionally updated with the security update file based on the parameter.

Thus, each security program 120 may selectively avoid spending the resources on updating based on whether such update is warranted, as indicated by the parameter. More information relating to one exemplary implementation of such functionality will be set forth hereinafter in greater detail.

Figure 2:
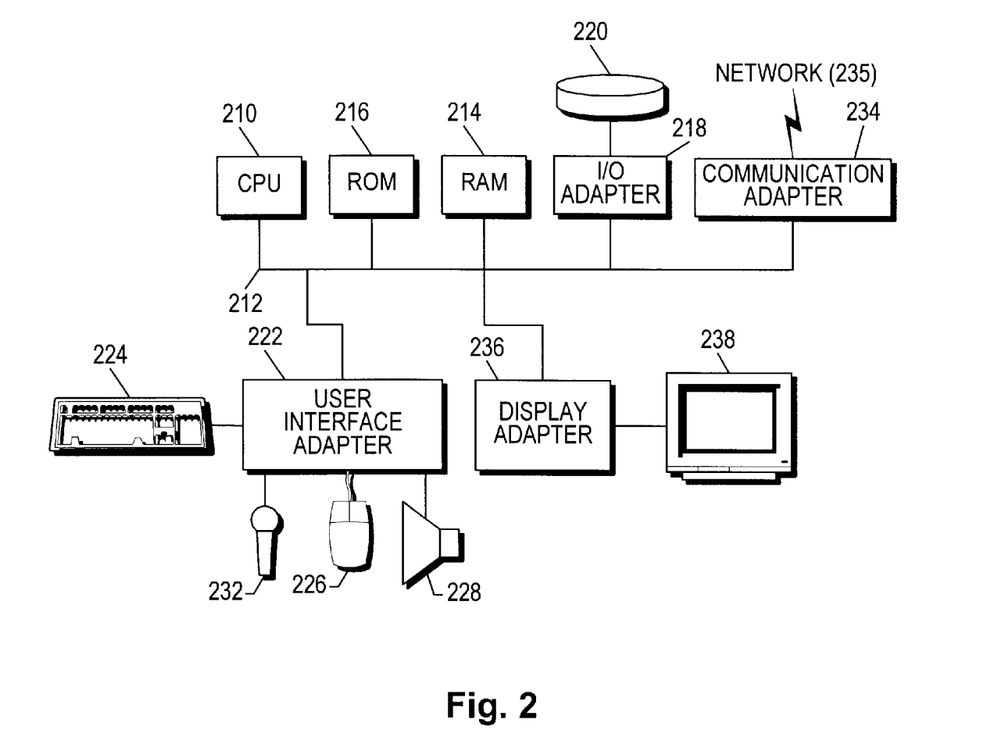
FIG. 2 shows a representative hardware environment that may be associated with the data servers and computers of FIG. 1, in accordance with one embodiment.

FIG. 2 shows a representative hardware environment that may be associated with the data servers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX/Linux operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
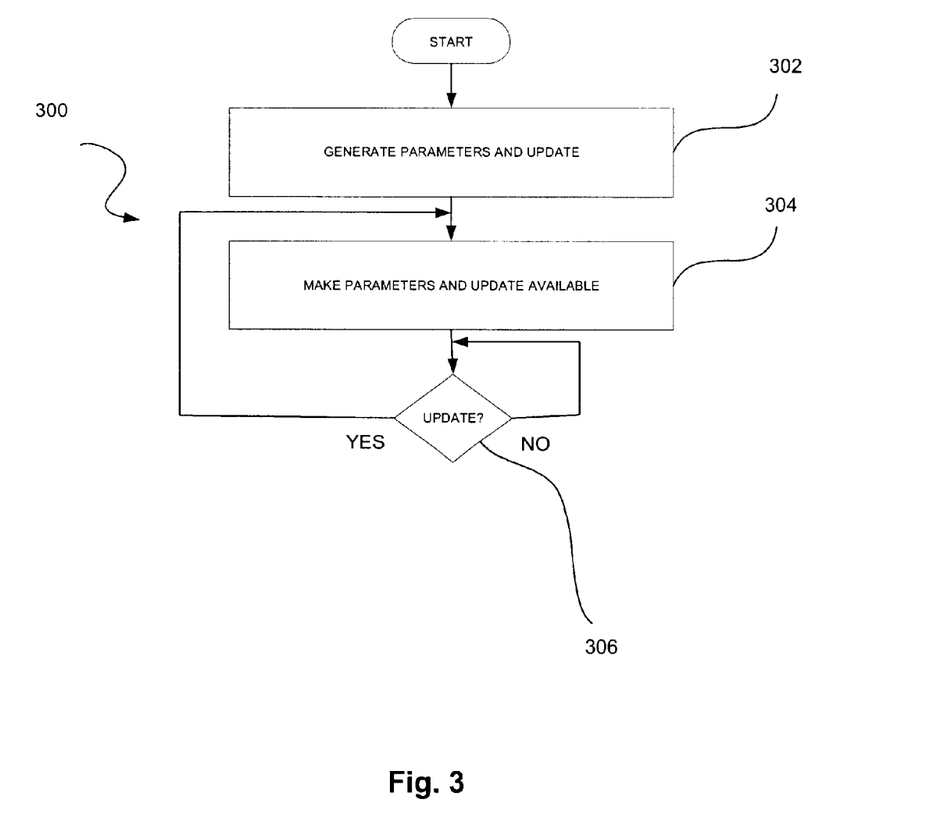
FIG. 3 illustrates a method for generating parameters and security update files for use in conditionally updating a security program.

FIG. 3 illustrates a method 300 for generating parameters and security update files for use in conditionally updating a security program. In one embodiment, the present method 300 may be used in the context of a security program like that mentioned hereinabove during reference to FIG. 1. Of course, the present techniques may be utilized in any desired context.

Initially, in operation 302, security update files and parameters are generated. Such security update files may include any data, information, etc. that may be used to modify or alter a security program on one or more user computers. Just by way of example, in the case where the security program includes a virus-scanning program, the security update files (i.e. DATs) may be used to include additional virus signatures with the security program.

Further, such parameters may include any data, information, etc. that describes the security update file or is related thereto, and which can be used in making a decision as to whether the security update file should be utilized to modify or alter the security program. It should be noted that such parameters may be generated in any desired automatic or manual manner using any desired techniques including heuristics, statistical analysis, a standard rule set, intuition, etc.

Once the security update files and parameters are generated, such security update files and parameters are made available to user computers or the like that have the security program operating thereon. See operation 304. This may be accomplished by posting the security update files and parameters on a network (i.e. the Internet), e-mailing the security update files and parameters, communicating the security update files and parameters using push technology, and/or any other desired method of making the security update files and parameters available.

In one embodiment, the parameters may be "detached" from the security update file. If some field situation changes (i.e. reports of field infections, false alarms or crashes, etc.) the parameters can be updated to immediately reflect on the update process. To this end, the security update file would not have to be re-posted.

Thus, the decision whether to modify parameter(s) can be either automated or manual—it can be event-based (i.e. some security breach, etc.) or based on a threshold (i.e. some number of viral infections were reported, etc.).

During use, the parameters may be updated to reflect the current status of a network (i.e. new viruses, false alarms, performance degradation, etc.). Thus, based on decision 306, additional security update files and parameters are generated and made available in the foregoing manner.

Figure 4:
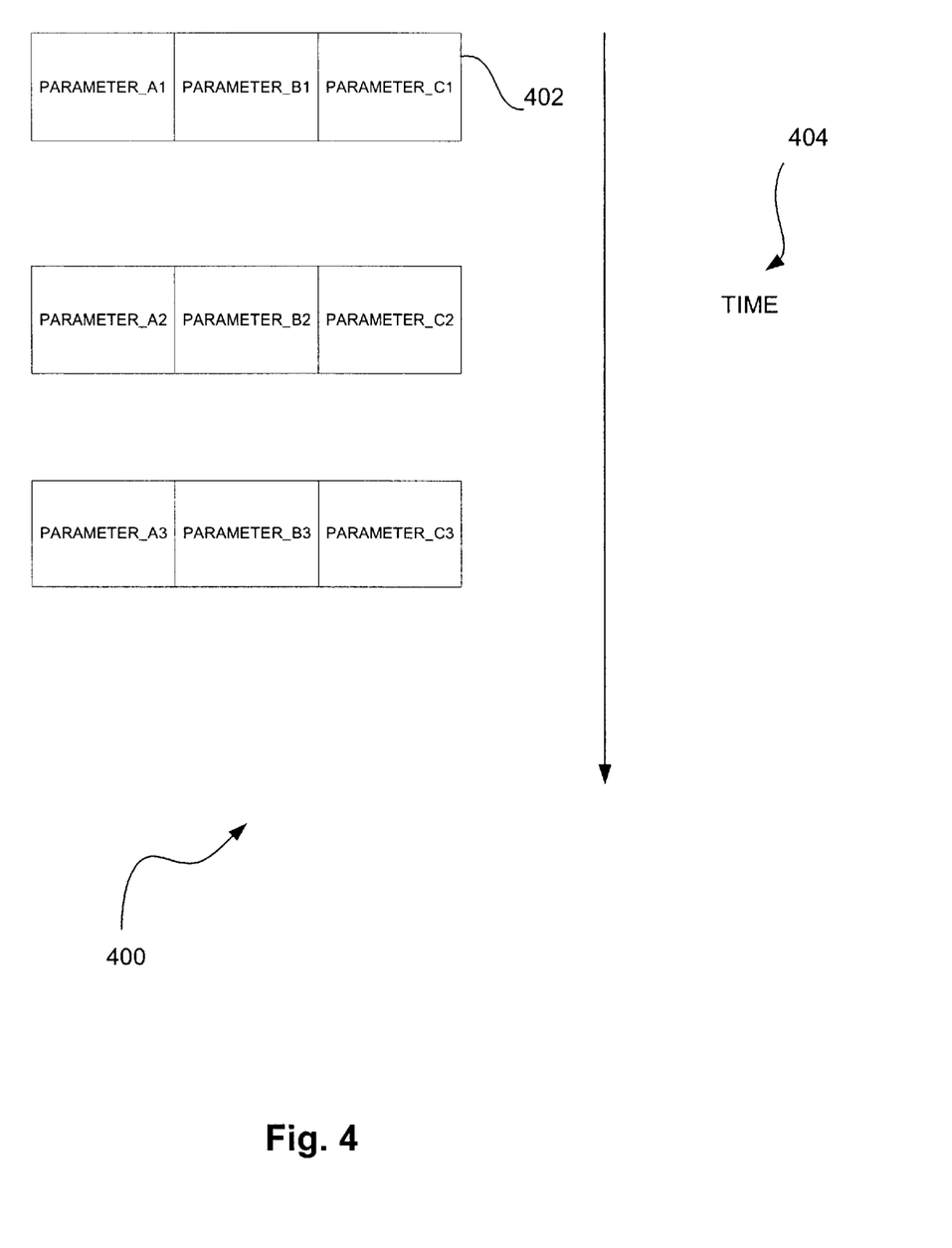
FIG. 4 illustrates a data structure for being used to conditionally update a security program, in accordance with one embodiment.

FIG. 4 illustrates a data structure 400 for being used to conditionally update a security program, in accordance with one embodiment. As shown, the data structure 400 may include an array of parameters 402 that may be updated over time 404. Each of the parameters may represent various aspects of a security update file.

Just by way of example, a parameter 402 may represent a priority associated with the security update file. Further, a parameter 402 may represent a risk associated with virus(es) that the security update file is capable of detecting. Still yet, a parameter 402 may represent a size of the security update file, or an estimated cost associated with the security update file. As an option, a parameter 402 may represent a prevalency associated with a virus that the security update file is capable of detecting. Again, the parameters 402 may represent any desired any data, information, etc. that describes the security update file or is related thereto, and which can be used in making a decision as to whether the security update file should be utilized to modify or alter the security program.

Table 1 illustrates an exemplary summary of the various aspects that may be represented by the parameters 402.

TABLE 1 number of new mass-mailing viruses/worms
number of new field mass-mailing viruses/worms
number of new field viruses
severity of added field viruses
severity of field viruses included (i.e. number of reports since last update)
number of new non-field viruses added
number of new field false alarms
severity of the false alarms
number of new name changes in the update
number of new entries in an update
severity of new entries (i.e. risk of the update)
number of crash reports for the update
performance degradation in the update
any combination of the above (i.e. also represented as overall update "score" or "cost")

In another embodiment, each of the parameters 402 of the array may correspond with one or more records of the security update file. In other words, the security update file may be parsed into portions each of which has an associated parameter 402. Thus, as will soon become apparent, the security program may be conditionally updated with the one or more records of the security update file based on the associated parameter 402.

Optionally, the array of parameters 402 may be expandable and customizable. For example, within a company where there is a significant level of infections with some virus only present in the last update, local clients may benefit from using a customized array that reflects the importance of this last update. The company can then make this customized version of the parameter(s) available from its own update server.

For reasons that will soon become apparent, each parameter 402 may identify a difference between the security update file and a previous security update file with respect to at least one particular aspect. Thus, a plurality of the parameters 402 associated with the security update file are generated each time the security update file is updated, where each parameter 402 represents an incremental parameter 402. For example, with reference to FIG. 4, Parameter_A2 represents a change with respect to Parameter_A1 in regards to a particular aspect associated with the security update file. Thus, the parameters 402 may be summed to track an aggregate affect of not updating using the security update file.

Of course, the parameters 402 may include non-cumulative and non-numeric elements. In particular, the parameter 402 may include data describing parameter fields so that update software can display the same to a user. Still yet, another embodiment may include logic to deal with missed arrays in a "summing" mode. This can be done by either forcing the summing to restart (by nullifying the sums) or by extrapolating the data to predict the values of parameter(s) in the missed update. The history of parameter(s) can also be made available for download to solve this problem.

Figure 5:
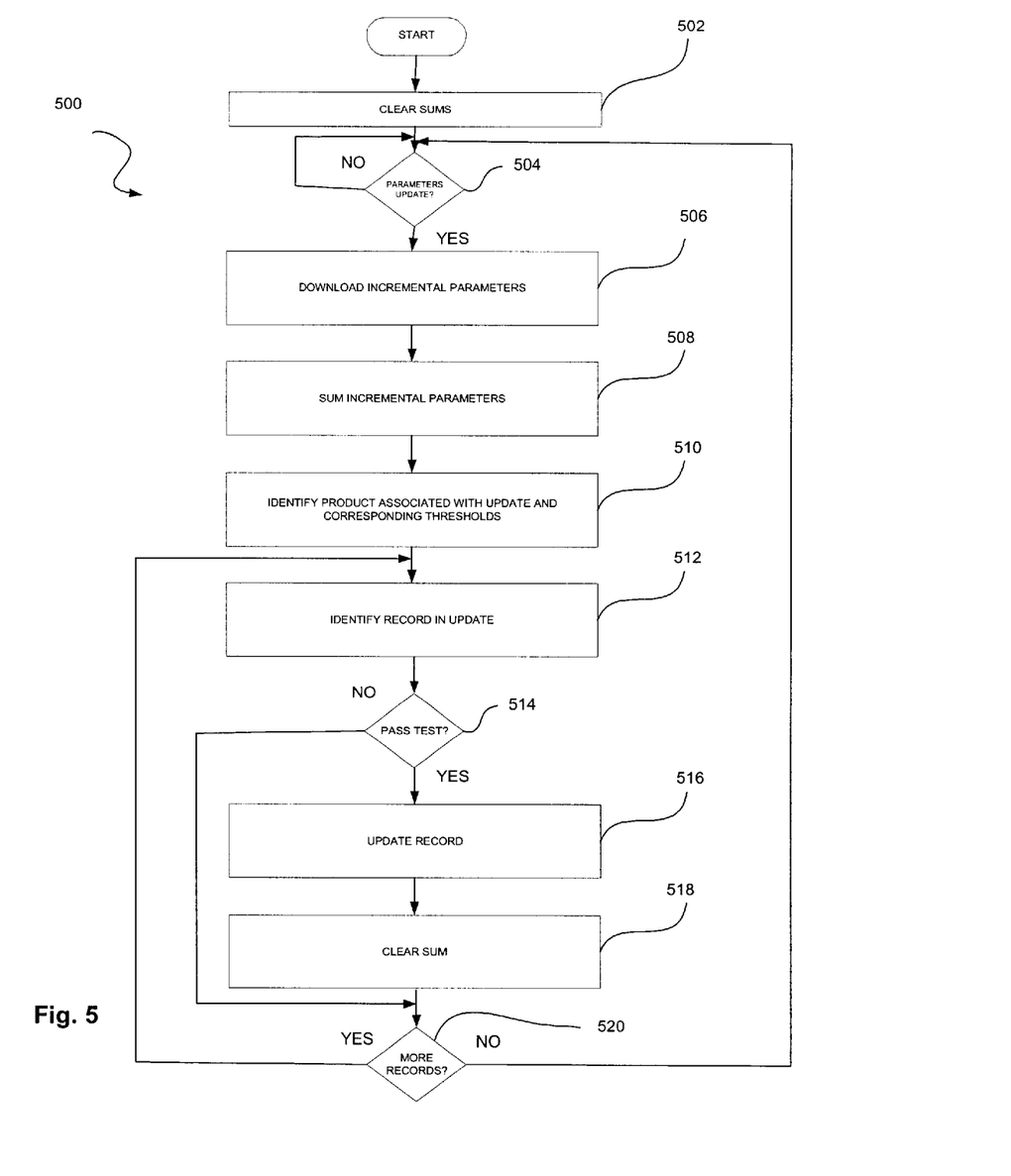
FIG. 5 illustrates a method for conditionally updating a security program based on parameters, in accordance with one embodiment.

FIG. 5 illustrates a method 500 for conditionally updating a security program based on parameters, in accordance with one embodiment. In one embodiment, the present method 500 may be used in the context of a security program like that mentioned hereinabove during reference to FIG. 1. Of course, the present techniques may be utilized in any desired context.

Initially, in operation 502, a sum is cleared. As will soon become apparent, such sum is cleared to track an aggregate effect of not updating a security program with security update files over time.

It is then determined whether parameters are available in decision 504. As mentioned earlier, each parameter represents at least one aspect of one or more records of a security update file. Moreover, the parameters identify a difference in the aspect between one or more records of the security update file and the corresponding one or more records of a previous security update file. Thus, the parameters are made available upon a new or revised security update file being available.

If the parameters are determined to be available in decision 504, the parameters are accessed in operation 506. It should be noted that the parameters may be accessed in any desired manner such as downloading, emailing, etc. By only accessing the parameters, bandwidth may be saved while a decision is made before downloading the security update file.

Such accessed parameters are then summed in operation 508. The purpose of this operation is to obtain an aggregate affect of not updating the security program with the security update file. In other words, a first parameter associated with a particular security update file may indicate a first level of risk in not effecting an update, while a second parameter associated with the security update file may indicate a second level of risk. Thus, by summing the parameters, an aggregate affect may be monitored to assess the decision as to whether to execute an update.

With the aggregate affect of parameters being tracked, the security update file may be conditionally used based on a test involving the set of parameters and a set of thresholds. The test may be set by the security program, included with the parameters, or set forth in any other desired manner. Similarly, the threshold may be identified in a variety of ways.

For example, the threshold may be updated by a user. Still yet, the threshold may optionally be selected based on the security program. In the present illustrated embodiment, a security program associated with the downloaded parameters may be identified. Moreover, a threshold corresponding with such software product may be identified. Note operation 510. Such threshold may be identified based on a look up operation involving a look up table, a formula, a manual decision, or the like. Still yet, the threshold may be included with an update.

At this point, the appropriate test, the aggregate affect of the parameters, and the threshold are ready to be used to make a decision as to whether the security update file should be used in a formal update of the security program. As an option, this decision may be made for the security update file as a whole, or for each portion (i.e. record) of the security update file.

As shown in FIG. 5, a record may be identified in operation 512, after which it may be determined whether the record should be used to update the security program. See decision 514. If such test is passed, the security update file (or the record from it) is downloaded and installed in operation 516.

Again, it should be noted that the test may include any decision. If, for example, the threshold for update is 7 field viruses and, say, two weekly updates were released each including 4 field virus, then the second update would be performed because total for both is 8 (4+4), and 8 >7. Other array parameters may be analyzed in a similar way. In another example, the present method 500 may be able to check if the current security update file has at least 1 new field mass-mailing virus or 2 common false alarms; or if the security update file has 3 new field viruses and the performance degradation is <10%.

The test thus dictates the format of the array of parameters—they may be incremental in nature to allow summing. When a series of updates (n, n+1, n+2) and parameter(s) associated with each update exist, the definition of a parameter being incremental may be as follows in Table 2.

TABLE 2 parameter( n -> n+2 ) = parameter( n -> n+1 ) + parameter( n+1 -> n+2 )  [1]

For example, the size can be used as a parameter for updates [i.e. A (1200 kilobytes), B (1300 kilobytes), C (1350 kilobytes)]. The parameter associated with the B update (responsible for a change of definitions from A to B) is 100 kilobytes (1300–1200). For B to C transition, it is 50 kilobytes (1350–1300). The change from A to C (1350–1200) satisfies equation [1] because 1350–1200= 100+50.

This "summing" capability allows the update software to trigger an update "when necessary" (i.e. when there is enough reason to update). In essence, the value of a parameter can be viewed as a measure of the update "importance". The aggregate "importance" can be a complex function of individual parameters like the number of new records for newly threats, additional size, etc.

With reference again to FIG. 5, the sum associated with the current record is cleared in operation 518. This ensures that any future tests associated with the current parameter reflect the fact that the associated aspect is "reset," as a result of the use of the present security update file. The present method 500 may then be repeated based on the number of records in the present update file. See decision 520.

The present embodiment thus automates the update process and makes it highly configurable. This may be accomplished by providing an update process that introduces the following components. See Table 3.

TABLE 3 downloadable array of parameters (i.e. numerical values) describing a security program update (optionally stored on a server side)
configurable decision logic in the update process (optionally on a client side) that examines the parameters and decides whether to deploy the update
a summing system (optionally on the client side) that operates on a sequence of parameters and feeds the output into the decision logic While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for updating security software on a client, comprising:

receiving a parameter associated with a security update file; and conditionally updating a security program with the security update file based on the parameter;

wherein the parameter identifies a difference between the security update file and a previous security update file;

wherein the security program is conditionally updated with the security update file based on a test involving the parameter;

wherein the parameter represents at least one of a risk and a prevalency associated with a virus that the security update file is capable of detecting;

wherein an array of parameters is received and summed, and the security program is conditionally updated with the security update file based on the summed parameters;

the parameters including a number of new mass-mailing viruses, a severity of added field viruses, a number of new field false alarms, a severity of the false alarms, a number of new name changes in the update, a number of new entries in the update, a number of crash reports for the update, and a performance degradation in the update.

2. The method as recited in claim 1, wherein each parameter represents an additional priority associated with the security update file.

3. The method as recited in claim 1, wherein each parameter represents a size change of the security update file.

4. The method as recited in claim 1, wherein each parameter represents an additional cost associated with the security update file.

5. The method as recited in claim 1, wherein each of the parameters of the array corresponds with one or more records of the security update file.

6. The method as recited in claim 5, wherein the security program is conditionally updated with the one or more records of the security update file based on the associated parameter.

7. The method as recited in claim 1, wherein the array of parameters is expandable.

8. The method as recited in claim 1, wherein each parameter is customizable.

9. The method as recited in claim 1 wherein the parameters include a number of new records in the security update file.

10. The method as recited in claim 1, wherein each parameter associated with the security update file is received each time the security update file is updated.

11. The method as recited in claim 1, wherein the test further involves a threshold.

12. The method as recited in claim 11, wherein the threshold is updated by a user.

13. The method as recited in claim 11, wherein the threshold is selected based on the security program.

14. A method as recited in claim 1, wherein the security program is conditionally updated depending on a history of each parameter.

15. A computer program product for updating security software, comprising:
   computer code for receiving a parameter associated with a security update file; and
   computer code for conditionally updating a security program with the security update file based oil the parameter;
   wherein the parameter identifies a difference between the security update file and a previous security update file;
   wherein the security program is conditionally updated with the security update file based on a test involving the parameter;
   wherein the parameter represents at least one of a risk and a prevalency associated with a virus that the security update file is capable of detecting;
   wherein an array of parameters is received and summed, and the security program is conditionally updated with the security update file based on the summed parameters;
   the parameters including a number of new mass-mailing viruses, a severity of added field viruses, a number of new field false alarms, a severity of the false alarms, a number of new name changes in the update, a number of new entries in the update, a number of crash reports for the update, and a performance degradation in the update.

16. A system for updating security software, comprising:
   logic for receiving a parameter associated with a security update file; and
   logic for conditionally updating a security program with the security update file based on the parameter;
   wherein the parameter identifies a difference between the security update file and a previous security update file;
   wherein the security program is conditionally updated with the security update file based on a test involving the parameter;
   wherein the parameter represents at least one of a risk and a prevalency associated with a virus that the security update file is capable of detecting;
   wherein an array of parameters is received and summed, and the security program is conditionally updated with the security update file based on the summed parameters;
   the parameters including a number of new mass-mailing viruses, a severity of added field viruses, a number of new field false alarms, a severity of the false alarms, a number of new name changes in the update, a number of new entries in the update, a number of crash reports for the update, and a performance degradation in the update.

17. A data structure stored in memory capable of being used for updating security software, comprising:
   a parameter object associated with a security update file;
   wherein a security program is conditionally updated with the security update file based on the parameter object, and the parameter object identifies a difference between the security update file and a previous security update file;
   wherein the security program is conditionally updated with the security update file based on a test involving the parameter object;
   wherein an array of parameter objects is received and summed, and the security program is conditionally updated with the security update file based on the summed parameter objects;
   the parameter objects being selected from the group consisting of a number of new mass-mailing viruses, a severity of added field viruses, a number of new field false alarms, a severity of the false alarms, a number of new name changes in the update, a number of new entries in the update, a number of crash reports for the update, and a performance degradation in the update.

18. A method for updating security software utilizing a server, comprising:
   assigning a parameter to a security update file; and
   providing access to the parameter;
   wherein a security program is conditionally updated with the security update file based on the parameter, and the parameter identifies a difference between the security update file and a previous security update file;
   wherein the security program is conditionally updated with the security update file based on a test involving the parameter;
   wherein the parameter represents at least one of a risk and a prevalency associated with a virus that the security update file is capable of detecting;
   wherein an array of parameters is received and summed, and the security program is conditionally updated with the security update file based on the summed parameters;
   the parameters including a number of new mass-mailing viruses, a severity of added field viruses, a number of new field false alarms, a severity of the false alarms, a number of new name changes in the update, a number of new entries in the update, a number of crash reports for the update, and a performance degradation in the update.

19. A method for updating security software, comprising:
   downloading parameters representing at least one aspect of one or more records of a security update file, wherein at least one of the parameters identifies a difference between one or more records of the security update file and the corresponding one or more records of a previous security update file with respect to the at least one aspect;
   summing the parameters; and
   conditionally updating a security program with the one or more records of the security update file based on the sum of parameters;
   wherein the security program is conditionally updated with the security update file based on a test involving the sum;

wherein the sum represents a risk and a prevalency associated with a virus that the security update file is capable of detecting;

the parameters including a number of new mass-mailing viruses, a severity of added field viruses, a number of new field false alarms, a severity of the false alarms, a number of new name changes in the update, a number of new entries in the update, a number of crash reports for the update, and a performance degradation in the update.

20. A method for updating security software, comprising:

clearing a sum;

determining whether parameters are available each representing at least one aspect of one or more records of a virus signature update file, wherein the parameters identify a difference between one or more records of the virus signature update file and the corresponding one or more records of a previous virus signature update file with respect to the at least one aspect;

downloading the parameters if the parameters are determined to be available;

summing the parameters;

identifying an anti-virus security program associated with the downloaded parameters;

looking up a threshold corresponding with the anti-virus security program associated with the downloaded parameters; and for each of the records of the virus signature update file, performing a test involving the summed parameters associated with the current record and the threshold, if the test is passed,
  downloading the virus signature update file,
  installing the virus signature update file in the anti-virus security
program, and
clearing the sum;

wherein the parameter represents at least one of a risk and a prevalency associated with a virus that the security update file is capable of detecting;

the parameters including a number of new mass-mailing viruses, a severity of added field viruses, a number of new field false alarms, a severity of the false alarms, a number of new name changes in the update, a number of new entries in the update, a number of crash reports for the update, and a performance degradation in the update.

21. The method as recited in claim 1, wherein the parameters are summed by forcing summing to restart.

22. The method as recited in claim 1, wherein the parameters are summed by extrapolating data to predict values of parameters in a missed update.

* * * * *

UNITED STATES PATENT AND TRADEMARK OFFICE
CERTIFICATE OF CORRECTION

PATENT NO. : 6,785,820 B1 Page 1 of 1
APPLICATION NO. : 10/115379
DATED : August 31, 2004
INVENTOR(S) : Muttik et al.

It is certified that error appears in the above-identified patent and that said Letters Patent is hereby corrected as shown below:

Front Page, Item 75 Replace "Vincent P. Gulletten" with --Vincent P. Gullotto--;
Column 6, lines 20-21 Replace "parameter (s)" with --parameter(s)--;
Column 9, line 25 Replace "oil" with --on--.

Signed and Sealed this

Seventh Day of December, 2010

David J. Kappos
*Director of the United States Patent and Trademark Office*